United States Patent [19]

Shenoy et al.

[11] Patent Number: 4,707,994
[45] Date of Patent: Nov. 24, 1987

[54] GAS SEPARATION PROCESS WITH SINGLE DISTILLATION COLUMN

[75] Inventors: Thirthahalli A. Shenoy, Whitehall; Keith B. Wilson, Allentown, both of Pa.

[73] Assignee: Air Products and Chemicals, Inc., Allentown, Pa.

[21] Appl. No.: 838,233

[22] Filed: Mar. 10, 1986

[51] Int. Cl.$^4$ ............................................. F25J 3/00
[52] U.S. Cl. ............................................. 62/11; 62/38; 62/42
[58] Field of Search ..................... 62/11, 36, 38, 42

[56] References Cited

U.S. PATENT DOCUMENTS

| | | | |
|---|---|---|---|
| 3,214,926 | 11/1965 | Shaievitz et al. | 62/14 |
| 3,217,502 | 11/1965 | Keith et al. | 62/13 |
| 3,394,555 | 4/1968 | La Fleur | 62/40 |
| 3,731,495 | 5/1973 | Coveney | 62/39 |
| 4,099,945 | 7/1978 | Skolaude | 62/38 |
| 4,132,766 | 1/1979 | Erickson | 423/579 |
| 4,152,130 | 5/1979 | Theobald | 62/18 |
| 4,224,045 | 9/1980 | Olszewski et al. | 62/30 |
| 4,375,367 | 3/1983 | Prentice | 62/38 |
| 4,382,366 | 5/1983 | Gaumer | 62/32 |
| 4,595,405 | 6/1986 | Agrawal et al. | 62/38 |

*Primary Examiner*—Ronald C. Capossela
*Attorney, Agent, or Firm*—Willard Jones, II; James C. Simmons; William F. Marsh

[57] ABSTRACT

The present invention is directed to a gas separation system for the recovery of pressurized, substantially pure, constituent gaseous products from a gas mixture using a single pressure distillation column with the feed gas as the working fluid for column reflux and reboil. The present invention is particularly useful for the separation of air into pressurized oxygen and nitrogen products. In an air separation process the nitrogen stream is utilized as secondary cooling gas for a combuster, the exhaust gas of which when fed to a gas turbine can provide air feed compression energy and/or electrical power generation for export or process operation when a generator is attached to the turbine.

18 Claims, 4 Drawing Figures

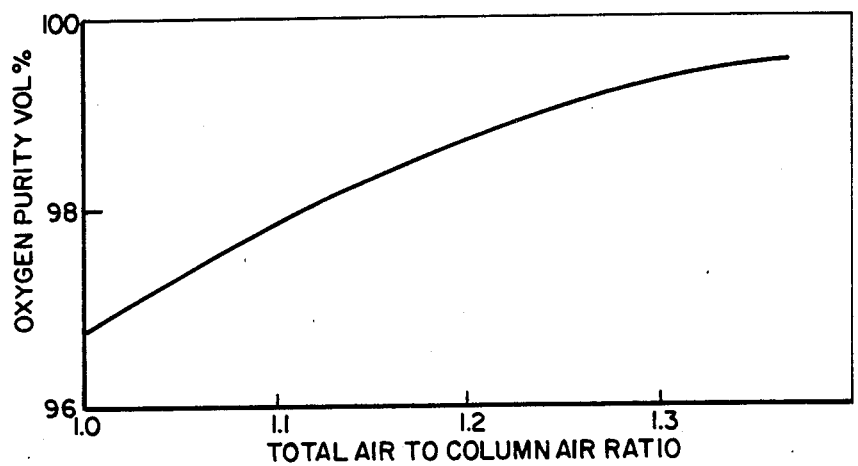
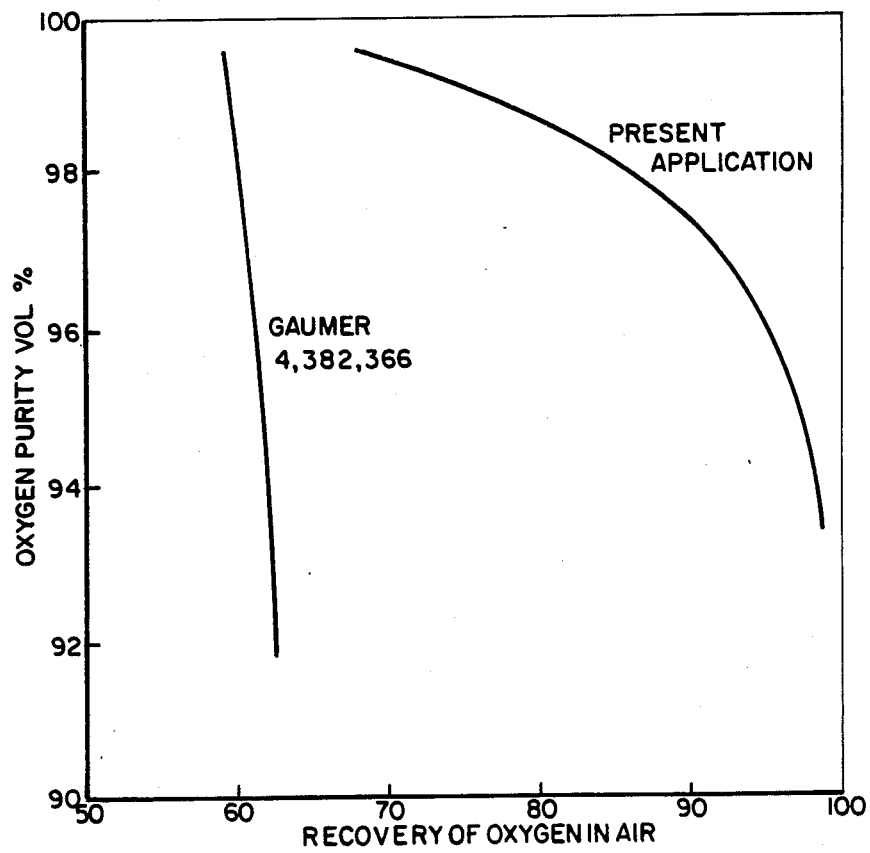

GAS SEPARATION PROCESS WITH SINGLE DISTILLATION COLUMN

TECHNICAL FIELD

The present invention is directed to the separation of gas mixtures into substantially pure, pressurized, constituent gaseous products.

BACKGROUND OF THE PRIOR ART

Various processes have been known and utilized in the prior art for the separation of gas mixtures into their dominant constituents. Additionally, the use of a single pressure distillation column is known to have been used in the prior art for such separations.

In U.S. Pat. No. 3,214,926 a method for producing liquid oxygen or liquid nitrogen is set forth. However, in the patent it is necessary to have two distillation columns, one at high pressure and another at low pressure in order to extract liquid oxygen.

In U.S. Pat. No. 3,217,502 a system is descrbed which utilizes a single pressure distillation column. The product of this air separation system is liquid nitrogen and the oxygen, which was contained in the air feed, is vented to waste. In this patent, it is the oxygen stream which is expanded in order to provide refrigeration for the air separation system.

An air separation unit for the production of oxygen is disclosed in U.S. Pat. No. 3,394,555 wherein the combustion of a separate fuel source such as powdered coal is burned with oxygen or an air-oxygen mixture in which the oxygen is derived from the air separation unit. This combustion process provided power for the compression of helium gas for refrigeration necessary to the cryogenic separation system. Power from such combustion is derived from a magnetohydrodynamic power generator.

U.S. Pat. No. 3,731,495 discloses an air separation system using an air feed compressor which is powered by combustion gases directed through a turbine. The turbine exhaust heats boiler steam to supplement the compressor drive. Electric generation is also considered. In addition, this reference utilizes two separate columns at separate pressures for the recovery of the individual gaseous components of air which are separated.

U.S. Pat. No. 4,152,130 discloses an air separation unit which has multiple feeds to a two pressure-two stage distillation column. Both feeds to the distillation column are expanded through an expander. The system may produce liquid oxygen or liquid nitrogen as desired.

U.S. Pat. No. 4,224,045 is directed towards a process where oxygen is produced by distillation of liquefied air in a two column unit. A gas turbine, powered in part by a nitrogen stream from the distillation, supplies the energy to compress the feed air.

U.S. Pat. No. 4,382,366 discloses an air separation unit which uses a single pressure distillation column and burns a depleted oxygen stream to provide power for the air compressor, however the oxygen product needs to be recompressed. The distillation column of this patent has a split feed and utilizes a portion of the feed to control reboil and reflux. Reflux control is by introduction of the stream into the top of the column rather than use as a condenser working fluid.

The art as represented above has failed to disclose an efficient manner in which to separate gas constituents from gas mixtures with the utilization of a single pressure distillation column which utilizes the feed gas as the working fluid to provide both reflux and reboil.

BRIEF SUMMARY OF THE INVENTION

The present invention is directed to a process for separating substantially pure, pressurized, constituent gaseous products from a gas mixture in a single pressure distillation column which comprises the steps of: compressing a gas feed stream, unless already compressed; removing from the gas feed stream impurities which would freeze at cryogenic temperatures; cooling the gas feed stream; expanding and further cooling the gas feed stream in a turbine to produce work; heat exchanging the gas feed stream with the liquid phase of the bottom of the column to at least partially condense the gas feed stream and reboil at least part of the liquid; further cooling the at least partially condensed gas feed stream, splitting the subcooled stream into two substreams, expanding the first substream and introducing it to the distillation column as reflux; expanding the second substream to a lower pressure; heat exchanging the expanded second substream against the vapor phase from the top of the column to partially condense the vapor phase and to completely vaporize the second portion of the gas feed stream thereby providing column reflux; cold compressing the second substream to above column operating pressure; optionally, separating out a small side stream thereby increasing product purity; introducing the remaining second substream into an intermediate point of the column; removing, at pressure, a lower boiling point constituent gas product from the top of the column as the overhead product stream; and removing, at pressure, a higher boiling point constituent product from the bottom of the column.

The present invention is particularly useful for the separation of air into pressurized oxygen and nitrogen products. When used for air separation, the process comprises the enumerated steps above, in addition, the nitrogen product can be utilized as the secondary cooling gas for a combuster, the exhaust gas of which when fed to a gas turbine can provide mechanical energy which may be used for air feed compression and/or electric power generation for export or process operation.

BRIEF DESCRIPTION OF THE DRAWING

FIG. 3 is a plot of total air to distillation column air ratio versus product oxygen purity.

FIG. 4 is a plot of product oxygen purity versus recovery of oxygen in the feed, comparing the present invention and U.S. Pat. No. 4,382,366.

DETAILED DESCRIPTION OF THE INVENTION

Figure 1:
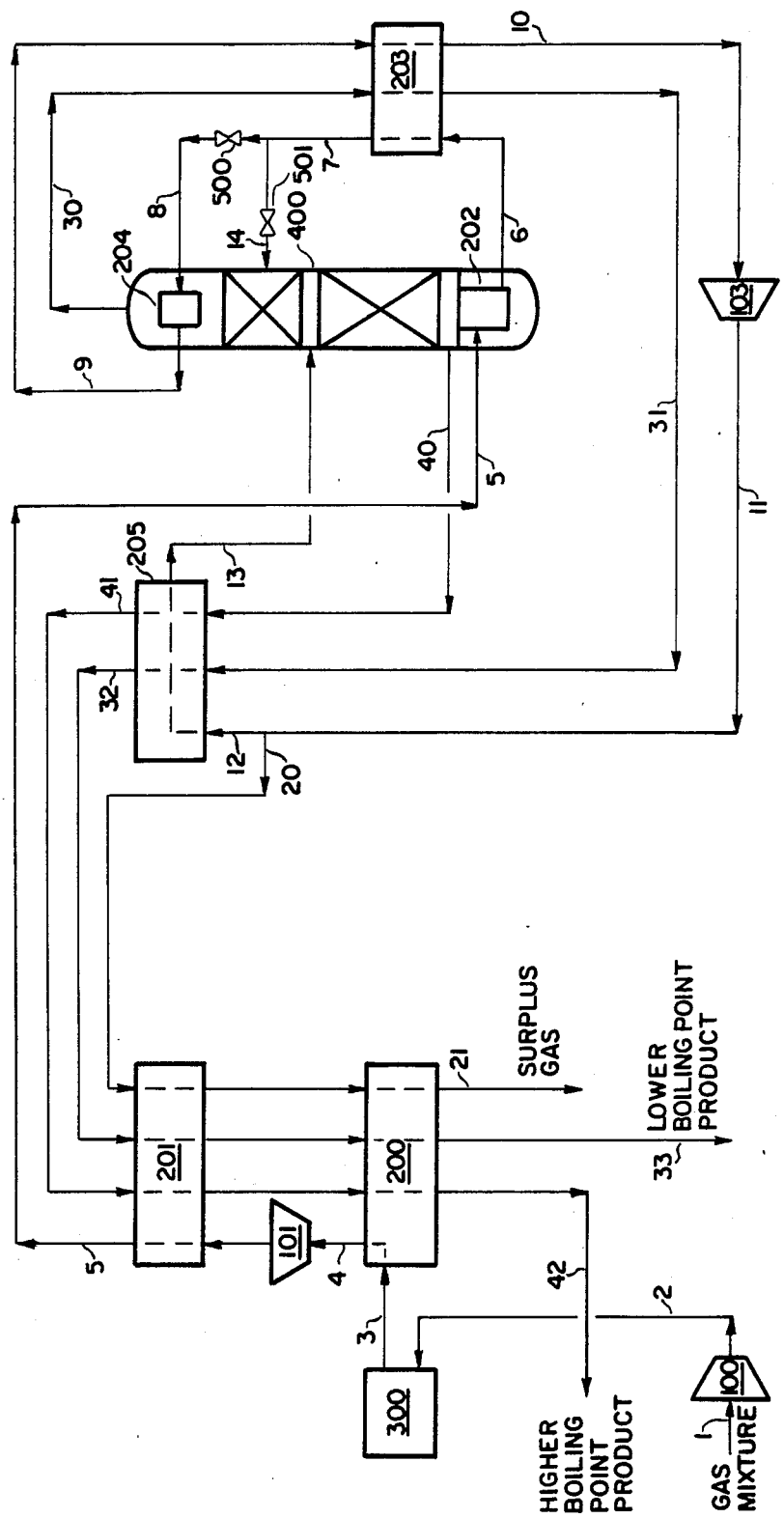
FIG. 1 is a flow sheet for the present invention; the flow sheet shows a gas separation unit which utilizes the gas feed stream as a working fluid for the reboiler and condenser.

With reference to FIG. 1, a cryogenic gas separator is shown with a single pressure distillation column. This column and the reboiler working fluid side must operate below the critical pressure of the feed gas mixture and the process must operate at pressures above atmospheric. The gas mixture stream 1, is fed to compressor 100. This step is unnecessary if the gas is already at a sufficiently high pressure. The pressurized gas feed, stream 2, is sent to unit 300 for removal of impurities which would freeze at cryogenic temperatures. This unit can be of any type which removes impurities which would freeze at cryogenic temperatures, the preferred unit is a molecular sieve unit. The gas feed is returned as stream 3 for cooling in heat exchanger 200 against warming product streams. Dependant upon the nature of the feed gas stream, it may be appropriate to cool the feed gas from its present temperature to the temperature at which optimum removal of the impurities would take place. If this was so, then feed gas stream 2 would be sent first to heat exchanger 200 for cooling to an optimum removal temperature, then sent to unit 300 for removal of impurities, and back to unit 200 for further cooling. The cooled feed gas, stream 4, is then expanded in turbine 101 to provide a portion of the refrigeration needs of the process and further cooled in heat exchanger 201. The expansion and further cooling step can be carried out in a single stage or in a multiplicity of stages, the relative heat capacities of the feed gas and of returning product streams will determine the number of stages best for the step.

The gas feed from heat exchanger 201, stream 5, is fed to reboiler 202 of distillation column 400 in which stream 5 provides heating duty sufficient to reboil liquid in the column and in the process is at least partially condensed itself. The liquefied gas, stream 6, leaving the reboiler is further cooled in heat exchanger 203. This subcooled stream, stream 7, is split into two substreams. The first substream is expanded through throttle valve, unit 501, and enters distillation column 400, primarily in the liquid phase, via stream 14. The second substream is expanded through throttle valve 500 to provide the low temperature cooling duty in the condenser 204, for distillation column 400. In the process of providing this duty, stream 8 is completely vaporized and this vapor stream, stream 9, is used to provide some subcooling duty to stream 6 in heat exchanger 203. The rewarmed vapor, stream 10, is then recompressed in cold compressor 103 to above column 400 operating pressure. This recompression is necessary because the pressure of stream 8 (after the expansion) is at a pressure lower than that of the column.

The exhaust stream of compressor 103, stream 11, at a pressure slightly higher than that of column 400, optionally, may be split into two streams. Because of the limitations in the reboiler and condenser duties of column 400, a small portion may be separated out thereby increasing product purity. Therefore, stream 20 is separated out and is warmed to ambient temperature and leaves as stream 21, titled "Surplus Gas". The larger portion of stream 11 or the entire portion in cases where no side stream is removed, stream 12, is cooled in heat exchanger 205 against rewarming product, streams 40 and 31 respectively. The cooled gas feed stream 13, is fed to distillation column 400.

The distillation column, a single pressure tower containing a multiplicity of trays, operates at superatmospheric pressures and effects a distillation separation between the lower boiling point constituent product, stream 30, and the higher boiling point constituent product, stream 40. The pressurized higher boiling point constituent product coming off the bottom of the column is reheated to ambient temperature in heat exchange units 205, 201 and 200 and leaves as stream 42, titled "Pressurized Higher Boiling Point Product".

The pressurized lower boiling point product, stream 30, off the top of column 400 is rewarmed to ambient in heat exchange units 203, 205, 201, and 200 and leaves as stream 33 titled "Pressurized Lower Boiling Point Product".

It may be mechanically convenient to supply the mechanical energy needed for cold compressor 103 from expander 101.

Figure 2:
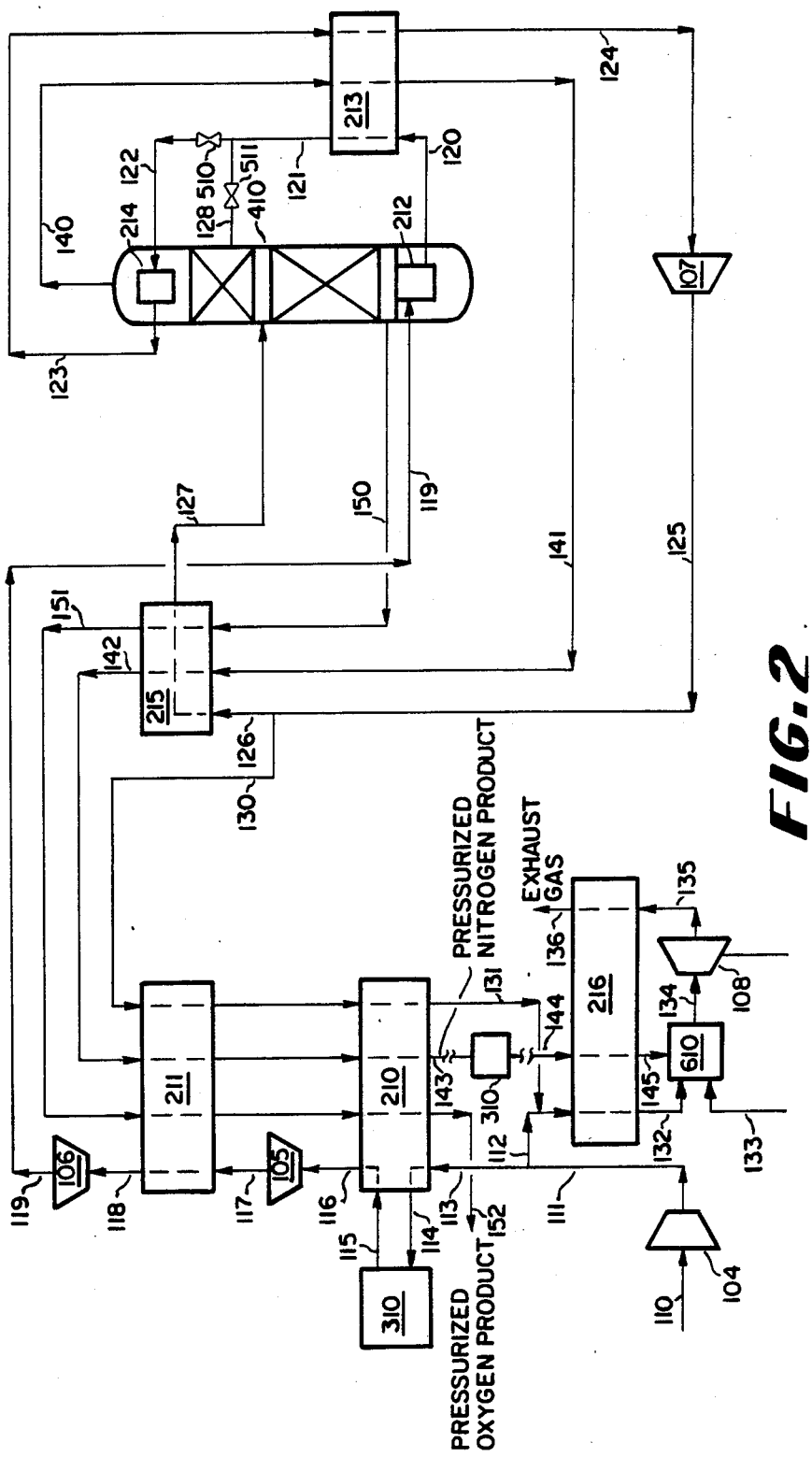
FIG. 2 is a flow sheet for the present invention in its preferred embodiment; the flow sheet shows an air separation unit for the production of oxygen and nitrogen products which utilizes the air feed stream as a working fluid for the reboiler and the condenser, a small side air stream for combustion gas along with a fuel, and the nitrogen product as secondary cooling air for quenching the combuster, the exhaust gas of which when fed to a gas turbine provides process compression energy and, optionally, electric power for process operation and export.

With reference to FIG. 2, a cryogenic oxygen generator is shown with a single pressure distillation column which operates below the critical conditions of air. Air, stream 110, is fed to compressor 104; the exhaust from this compressor, stream 111, is split with a portion of the air being fed for separation, stream 113, and the remainder of the air, stream 112, being heat exchanged and fed with a fuel to combuster 610. Air feed stream 113, which has been compressed, is cooled partly in heat exchanger 210, sent to the molecular sieve unit 310 for removal of water and carbon dioxide and returned as stream 115 for further cooling in heat exchnger 210 against warming product streams. The cooled feed air, stream 16, is then expanded in turbine 105 to provide a portion of the refrigeration needs of the process, further cooled in heat exchanger and then expanded (see stream 118) in turbine 106, to provide a further portion of the required refrigeration needs of the cycle.

The exhaust gas from turbine 106, stream 119, is fed to reboiler 212, of distillation column 410, in which stream 119 provides heating duty sufficient to reboil liquid in the column and in the process is at least partially condensed itself. The liquefied air, stream 120, leaving the reboiler is further cooled in heat exchanger 213, and the subcooled liquid, stream 121, is split into two substreams. The first substream is expanded through throttle valve 511 and enters distillation column 410, primarily in the liquid phase, stream 128. The second substream is then expanded through throttle valve 510 to provide the low temperature cooling duty in condenser 214 for distillation column 410. In the process of providing this duty, stream 122 is completely vaporized and this vapor stream, stream 123, is used to provide some subcooling duty to stream 120 in heat exchanger 213. The rewarmed vapor, stream 124, is then recompressed in cold compressor 107, to above column 410 operating pressure. This recompression is necessary because the pressure of stream 122 (after the expansion) is at a pressure lower than that of the column.

The exhaust stream of compressor 107, stream 125, at a pressure slightly higher than that of column 410, may be split into two streams. Because of the limitations in the reboiler and condenser duties of the column, a small portion, may be separated out thereby increasing product purity. FIG. 3 shows a plot of the ratio of total air throughput to the process to air throughput to the distillation column versus product oxygen purity is given. As can be seen from this plot to achieve oxygen purities in excess of about 96.5 vol %, excess air throughput to the process is required; it is this excess which is removed in stream 130. Therefore, stream 130 is separated out and is warmed to ambient temperature and leaves as stream 131. The larger portion of stream 125 or the entire portion when no side stream is removed, stream 126. is cooled in heat exchanger 215 against rewarming product, streams 150 and 41 respectively. The cooled air feed stream 127, is fed to the distillation column 410.

The distillation column, a single pressure tower containing, for example, 50 or so trays, operates at superatmospheric pressures, to about 200 psia, and effects a distillation separation between an oxygen product, stream 150, and a nitrogen product, stream 140. The pressurized oxygen product coming off the bottom of the column is reheated to ambient temperature in heat exchangers 215, 211 and 210 and leaves as stream 152, titled "Pressurized Oxygen Product".

The pressurized nitrogen product, stream 140, off the top of column 410 is rewarmed to ambient in heat exchange units 213, 215, 211, and 210 and leaves as stream 143 titled "Pressurized Nitrogen Product". This pressurized nitrogen product, stream 143, being water and carbon dioxide free and at a pressure below that of stream 114 is an ideal stream to use in whole or part for the regeneration of molecular sieve unit 310. Whether used to regenerate the molecular sieve unit or not, the pressurized nitrogen stream is used as secondary cooling gas for combuster 610. The exit gas, stream 134, from combuster 610 is used to drive gas turbine 108, which provides power to compress the air feed, stream 110. The recycled air stream, stream 131, along with the slip o compressed air stream, stream 112, and a fuel, stream 133, are combusted to produce the compression power.

In order to provide sufficient cooling energy to enable the cycle to perform as required, it is necessary that the air feed, stream 113, is compressed to a pressure such that expansion in expanders 105 and 106 are sufficient to both run compressor 107 and to provide sufficient refrigeration to compensate for heat leaks and the warm end temperature approach in heat exchanger 210. Thus, for example, feed air (stream 113) is compressed to 400 psia and after cooling (see stream 116) expanded to about 325 psia in expander 105 to provide upper temperature level refrigeration and then further expanded in expander 106 to about 150 psig to provide lower temperature level refrigeration. At least some of the power extracted from these expanders may be used to run the cold compressor 107. The Joule-Thompson expansion valve 510, further reduces the pressure of the air feed stream 122 so that the reboiling of the liquid part of the stream 122 is enabled to provide the condensing duty in exchanger 214 for column 410.

To demonstrate the effectiveness of the present invention the following example is provided.

EXAMPLE

Referring to FIG. 1, the gas mixture stream 1, in this case the gas mixture being air, is fed to compressor 100 and compressed from ambient conditions to a pressure of 417 psia and a temperature of 32° C. The pressurized feed, stream 2, is sent to unit 300 for removal of carbon dioxide and water vapor and is returned as stream 3 for cooling in unit 200 against warming product streams. The cooled feed, stream 4, is then expanded in turbine 101 to provide a portion of the work needs of the process and further cooled in heat exchanger 201. The expansion and further cooling step can be carried out in a single stage or in a multiplicity of stages, the relative heat capacities of the feed gas and of returning product streams will determine the number of stages best for the step.

The feed from heat exchanger 201, stream 5, which is at a pressure of 250 psia and a temperature of −155° C., is fed to reboiler 202 of distillation column 400 in which stream 5 provides heating duty sufficient to reboil liquid in the column and in the process is at least partially condensed itself. The liquefied gas, stream 6, leaving the reboiler, at a pressure of 250 psia and a temperature of −158° C., is further cooled in heat exchanger 203; this subcooled stream, stream 7, is split into two substreams. The first substream which comprises about 15 wt % of stream 7 is expanded through throttle valve, unit 501, and enters distillation column 400, via stream 14. The conditions of this stream 14 are a pressure of 107 psia and a temperature of −172° C. The second substream which is the remaining 85 wt % of stream 7 is expanded through throttle valve 500, to provide the low temperature cooling duty in condenser 204, for distillation column 400. The conditions of this stream 8 are a pressure of 71 psia and a temperature of −177° C. In the process of providing this duty, stream 8 is completely vaporized and this vapor stream, stream 9, is used to provide some subcooling duty to stream 6 in heat exchanger 203. The rewarmed vapor, stream 10, is then recompressed in a cold compressor 103 to a pressure of 108.5 psia, a pressure in excess of distillation column 400, operating pressure of 108 psia.

The exhaust stream of compressor 103, stream 11, is split into two streams. A small portion, about 7.4 wt % of stream 11, is separated out in stream 20 and is warmed to ambient temperature and leaves as stream 21, titled "Surplus Gas". The remaning 92.6 wt % of stream 11 is cooled in a heat exchanger and is fed to distillation column 400. The conditions of this stream are a pressure of 108 psia and a temperature of −157° C.

The distillation column effects a distillation separation between the nitrogen-rich product, stream 30, and the oxygen-rich product, stream 40. The pressurized oxygen rich product coming off the bottom of column 400 is reheated to ambient temperature in heat exchange units 205, 201 and 200 and leaves as stream 42, at a pressure of 107 psia and a oxygen purity of 97.7 vol %. The pressurized nitrogen rich product, stream 30, off the top of column 400 is rewarmed to ambient in heat exchangers 203, 205, 201, and 200 and leaves at a pressure of 106 psia and a nitrogen purity of 98 vol %.

The present invention provides a favorable improvement over known air separation systems. As shown in Table I below, the present invention, operating the above conditions, separate air into its constituent components at a reduced power requirement over a commonly assigned patented cycle disclosed in U.S. Pat. No. 4,382,366. The range of power savings over U.S. Pat. No. 4,382,366 is about 2–10% depending on oxygen product purity. A calculated power reduction of over 2 percent is believed to be a significant reductlon in gas separation systems.

TABLE I

|  | U.S. Pat. No. 4,382,366 | Present Invention |
|---|---|---|
| Power Required, KWH/NM$^3$ | 0.322 | 0.317 |
| Improvement, percent | — | 7.4 |

The basis of the evaluatlon was an oxygen product rate of 1686 kg moles/hr, at 97.7 volume percent oxygen in the product, a temperature of 15° C. and a product pressure of 107 psia.

Another benefit of the present inventon in comparson to the prior art, in particular U.S. Pat. No. 4,382,366 is the recovery of feed oxygen. In U.S. Pat. No. 4,382,366. the recovery of feed oxygen is limited by the oxygen concentration in the air supplied as reflux, but in the present invention, the oxygen recovery is effected by the interaction of the liquid reflux and the vapor reboil, therefore oxygen recovery increases dramatcally with changes in oxygen purity. This effect is shown in FIG. 4. This change ln recovery has an effect on the capital investment. For example, at a 97 vol % pure oxygen product the present invention would need only process two-thirds of the air feed required by U.S. Pat. No. 4,382,366.

Therefore based on the previous detailed description, it is a feature of the present invention to use the gas feed stream as a working fluid for both the reboiler and the condenser of the column prior to introduction of the gas feed stream into the column.

Another feature of the present invention is the use of a cryogenic gas separation system for the recovery of pressurized, substantially pure nitrogen and oxygen products from air.

It is another feature of the present invention to generate oxygen from air in a single pressure column wherein the power requirement of the air compression necessary for separation of the oxygen is derived from utilizing the nitrogen product stream as secondary cooling air for a combuster, the exit gas of which is used to drive a gas turbine which in turn produces the power for air compression and/or electricity for export and process operations when the gas turbine is connected to a generator.

It is another feature of the present invention to utilize the nitrogen product stream, in whole or in part, to regenerate the molecular sieve unit.

The present invention has been described with reference to a preferred embodiment thereof. However, this embodiment should not be considered a limitation on the scope of the invention, which scope should be ascertained by the following claims.

We claim:

1. A process for cryogenic separation of substantially pure, pressurized, constituent gas products from a gas mixture in a single pressure distillation column which comprises the steps of:
    (a) providing a compressed gas feed stream;
    (b) removing impurities that would freeze at cryogenic temperatures from the gas feed stream;
    (c) cooling the gas feed stream;
    (d) expanding and further cooling the gas feed stream in a turbine to produce work;
    (e) heat exchanging the gas feed stream with the liquid phase of the bottom of the column to at least partially condense the gas feed stream and reboil at least part of the liquid;
    (f) splitting the feed gas stream into two substreams;
    (g) expanding the first substream and feeding it to the distillation column primarily in the liquid phase;
    (h) expanding the second substream to a lower pressure and heat exchanging the expanded gas feed stream against the vapor phase of the top of the column to partially condense the vapor phase and to completely vaporize the gas feed stream thereby providing column reflux;
    (i) cold compressing the second substream to above column operating pressure;
    (j) introducing the second substream into an intermediate point of the column;
    (k) removing, at pressure, a lower boiling point constituent gas product from the top of the column as the overhead product stream; and
    (l) removing, at pressure, a higher boiling point constituent product from the bottom of the column.

2. The process of claim 1 which further comprises the step of: removing a small side stream of the second substream prior to introduction into the intermediate point of the column, thereby increasing product purity.

3. A process for cryogenic separation of a substantially pure, pressurized, oxygen product from air in a single pressure distillation column which comprises the steps of:
    (a) providing a compressed air feed stream;
    (b) removing impurities which would freeze at cryogenic temperatures from the air feed stream;
    (c) cooling the air feed stream;
    (d) expanding and further cooling the air feed stream in a turbine to produce work;
    (e) heat exchanging the air feed stream with the liquid phase of the bottom of the column to at least partially condense the air feed stream and reboil at least part of the liquid;
    (f) splitting the air feed stream into two substreams;
    (g) expanding the first substream and feeding it to the distillation column primarily in the liquid phase;
    (h) expanding the second substream to a lower pressure and heat exchanging the expanded gas feed stream against the vapor phase of the top of the column to partially condense the vapor phase and to completely vaporize the gas feed stream thereby providing column reflux;
    (i) cold compressing the second substream to above column operating pressure;
    (j) introducing the second substream into an intermediate point of the column;
    (k) removing, at pressure, a nitrogen product from the top of the column as the overhead product stream; and
    (l) removing, at pressure, a substantially pure oxygen product from the bottom of the column.

4. The process of claim 3 which further comprises the step of: removing a small side stream of the second substream prior to introduction into the intermediate point of the column, thereby increasing product purity.

5. The process of claim 4 which further comprises the step of: utilizing the nitrogen product as secondary cooling gas for quenching of a combuster, the exhaust gas of which drives a gas turbine which provides the power for air compression.

6. The process of claim 5 wherein the impurities which would freeze at cryogenic temperatures are water and carbon dioxide.

7. The process of claim 5 wherein the impurities which would freeze at cryogenic temperatures are removed in a molecular sieve unit.

8. The process of claim 7 which further comprises the step of: utilizing the nitrogen product to regenerate the molecular sieve unit prior to being fed as secondary cooling gas to the combuster.

9. The process of claim 8 wherein the gas turbine drives the compressor and a generator for production of electrical power for export or process requirements.

10. The process of claim 5 wherein the gas turbine drives the compressor and a generator for production of electrical power for export or process requirements.

11. The process of claim 4 wherein the impurities which would freeze at cryogenic temperatures are water and carbon dioxide.

12. The process of claim 4 wherein the impurities which would freeze at cryogenic temperatures are removed in a molecular sieve unit.

13. The process of claim 12 which further comprises the step of: utilizing the nitrogen product to regenerate the molecular sieve unit.

14. The process of claim 3 which further comprises the step of: utilizing the nitrogen product as secondary cooling gas for quenching of a combuster, the exhaust gas of which drives a gas turbine which provides the power for air compression.

15. The process of claim 14 wherein the gas turbine drives the compressor and a generator for production of electrical power for export or process requirements.

16. The process of claim 3 wherein the impurities which would freeze at cryogenic temperatures are water and carbon dioxide.

17. The process of claim 3 wherein the impurities which would freeze at cryogenic temperatures are removed in a molecular sieve unit.

18. The process of claim 17 which further comprises the step of: utilizing the nitrogen product to regenerate the molecular sieve unit.

* * * * *